G. C. POUNDSTONE.
PAN LIFTER.
APPLICATION FILED OCT. 28, 1913.
1,137,896.
Patented May 4, 1915.
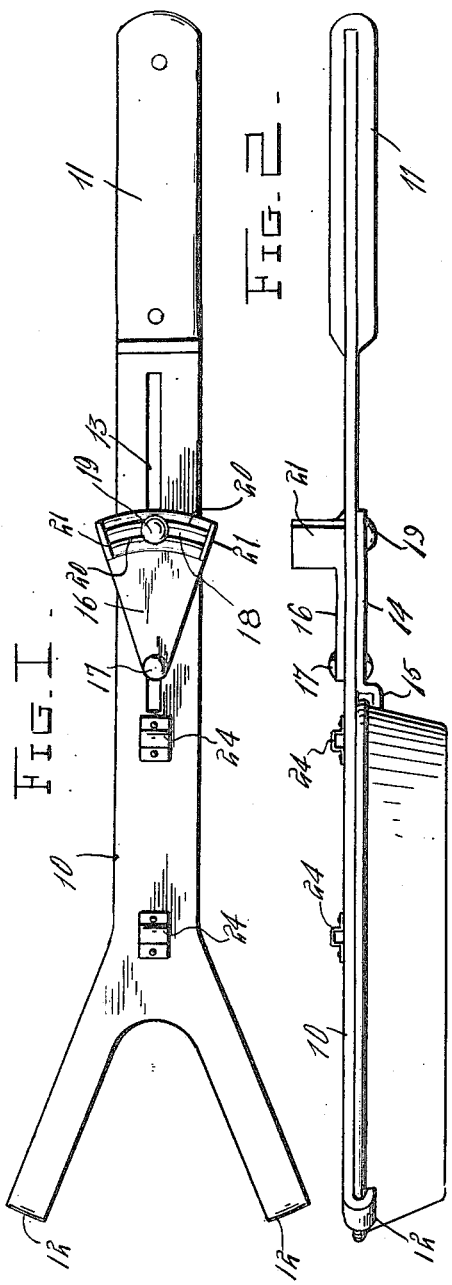
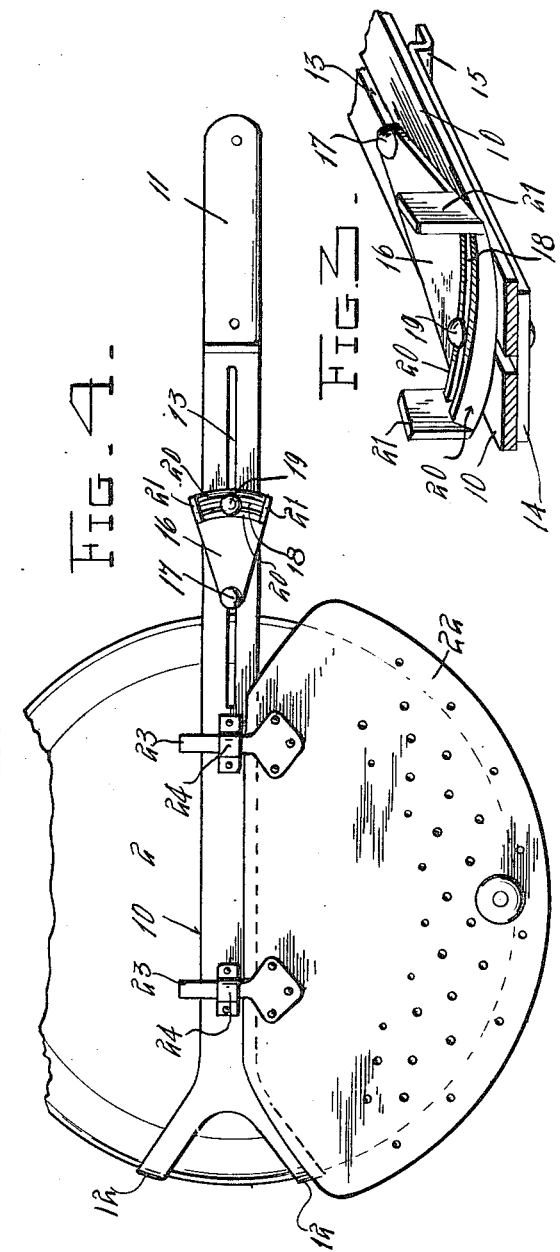
Witnesses
J. C. Simpson
Francis Boyle
Inventor
G. C. Poundstone.
By
Attorneys

UNITED STATES PATENT OFFICE.

GEORGE C. POUNDSTONE, OF CHICAGO, ILLINOIS.

PAN-LIFTER.

1,137,896.      Specification of Letters Patent.      Patented May 4, 1915.

Application filed October 28, 1913. Serial No. 797,831.

*To all whom it may concern:*

Be it known that I, GEORGE C. POUNDSTONE, a citizen of the United States, residing at Chicago, in the county of Cook, State of Illinois, have invented certain new and useful Improvements in Pan-Lifters; and I do hereby declare the following to be a full, clear, and exact description of the invention, such as will enable others skilled in the art to which it appertains to make and use the same.

This invention relates to handles for attachment to pans and has for an object to provide a handle that will have novel means that may be readily operated to clamp and release a pan, such means being devoid of set screws or other similar parts.

A further object of the invention is to provide a pan lifter that will have a novel swinging cam for locking or releasing the pan clamp.

With the above objects in view the invention consists of certain novel details of construction and combination of parts hereinafter fully described and claimed, it being understood that various modifications may be made in the minor details of construction within the scope of the appended claims.

In the accompanying drawing illustrating this invention:—Figure 1 is a plan view of a pan lifter embodying my improvements. Fig. 2 is a side elevation showing the lifter applied. Fig. 3 is a detail perspective view showing the cam and clamp. Fig. 4 is a plan view showing a strainer applied to the lifter.

Referring now to the drawing in which like characters of reference designate similar parts, the lifter is shown to comprise a Y-shaped shank 10 having a wood or similar grip 11 at one end and having the branches terminating in rearwardly opening hooks 12 for engagement with the rim of a pan most remote from the grip. The shank is provided with a longitudinal slot 13.

The pan clamp comprises a clamp member 14 which is slidably fitted to the underneath face of the shank 10 and is equipped at the forward end with a prong 15 which is engageable underneath the rim of the pan as shown. This clamp is slid up to the pan to the position shown in Fig. 2 and then locked in this position to secure the lifter to the pan, and to release the lifter the above movement of the clamp is reversed.

For sliding the clamp longitudinally of the shank 10 and also locking the same in operative position, a segmental shaped cam 16 is swiveled on the leading end of the clamp by means of a rivet 17 passed through the cam and through the slot in the shank and through the clamp. There is an arcuate slot 18 formed at the outer edge of the cam concentric with the rivet 17 and through this slot a rivet 19 projects, said rivet projecting through the slot in the shank and projecting loosely through an opening in the rear end of the clamp. A pair of inclined cam ribs 20 are formed on the cam plate on the opposite longitudinal edges of the slot 18 whereby when the cam is rocked in one direction the head of the rivet will be forced up with a resultant binding of the clamp 14 firmly against the shank 10 whereby the clamp is locked in postion. Upon the cam being rocked in the opposite direction the cam ribs will permit of the rivet gravitating with a resultant release of the clamp.

Formed at the ends of the ribs 20 are finger rests 21 which may be grasped by the thumb and forefinger to rock the cam on its pivot 17 and to also slide the cam with attached clamp bodily longitudinally of the shank 10 to operative or to released positions.

In connection with the plan lifter a strainer 22 of substantially the shape of one-half of a pan is provided, the strainer having spaced lugs 23 which are designed to engage snugly in sockets 24 formed on the shank 10 to retain the strainer in place.

In operation it is simply necessary to slide the clamp toward the pan to be lifted and when the clamp engages underneath the pan rim the cam may then be rocked outwardly to lock the clamp in this position as above described. To release the clamp the above operation is reversed.

From the above description it will be seen that I have provided an extremely simple and inexpensive pan lifter that is formed of a few light, strong and durable parts that will not easily get out of order.

What is claimed, is:—

1. A pan lifter comprising a shank, means on one end of said shank constructed and arranged to engage the rim of a pan, a clamp slidably mounted on the said shank constructed and arranged to engage the opposite side of the rim of a pan, a segmental locking member pivotally mounted on the said clamp and slidably arranged on the opposite side of the shank, a stud mounted on said clamp and extending through said shank and locking member, and means on the locking member coöperating with said stud whereby when the said locking member is swung pivotally the clamp will be secured in position.

2. A pan lifter comprising a shank having means on the end thereof to engage the rim of a pan, a clamp slidably mounted thereon to engage the opposite side of the pan, means for locking said clamp in predetermined positions and a pan cover detachably mounted on said shank.

3. A pan lifter comprising a shank having pan engaging means on one end thereof, a clamp slidably mounted on the lower face of said shank, the said shank having a longitudinally extending slot therein above the said clamp, a locking member pivotally secured to the said clamp and slidably mounted on the opposite side of the shank, a headed stud secured to the clamp and extending upwardly through the slot in the shank and the said locking member, the said locking member being provided with a cam constructed and arranged to coöperate with the head of the stud to bind the clamp in place upon the shank.

In testimony whereof, I affix my signature, in the presence of two witnesses.

GEORGE C. POUNDSTONE.

Witnesses:
F. JOHNSON,
CORA B. POUNDSTONE.